(12) United States Patent
Davydov

(10) Patent No.: US 11,601,174 B2
(45) Date of Patent: *Mar. 7, 2023

(54) QCL (QUASI CO-LOCATION) INDICATION FOR BEAMFORMING MANAGEMENT

(71) Applicant: Apple Inc., Cupertino, CA (US)

(72) Inventor: Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/313,452

(22) Filed: May 6, 2021

(65) Prior Publication Data

US 2021/0258056 A1 Aug. 19, 2021

Related U.S. Application Data

(63) Continuation of application No. 16/312,645, filed as application No. PCT/US2017/016695 on Feb. 6, 2017, now Pat. No. 11,018,743.

(Continued)

(51) Int. Cl.
*H04W 8/08* (2009.01)
*H04B 7/06* (2006.01)
(Continued)

(52) U.S. Cl.
CPC ......... *H04B 7/0617* (2013.01); *H04L 5/0051* (2013.01); *H04W 8/08* (2013.01);
(Continued)

(58) Field of Classification Search
None
See application file for complete search history.

(56) References Cited

U.S. PATENT DOCUMENTS 9,565,104 B2   2/2017  Zhang
11,018,743 B2 *  5/2021  Davydov ............ H04W 72/042
(Continued)

FOREIGN PATENT DOCUMENTS

WO   WO-2014112938 A1 *  7/2014  ............ H04B 7/024
WO       2015/088419 A1    6/2015
WO   WO-2015115991 A1 *  8/2015  .......... H04J 11/0023

OTHER PUBLICATIONS

International Search Report and Written Opinion dated May 11, 2017 for PCT Application PCT/US2017/016695.

(Continued)

*Primary Examiner* — Anh Vu H Ly
(74) *Attorney, Agent, or Firm* — Eschweiler & Potashnik, LLC

(57) ABSTRACT

Techniques for employing QCL (Quasi Co-Location) signaling for beamforming management are discussed. One example embodiment can comprise a baseband processor of a User Equipment (UE). The baseband processor comprises one or more processors to make a determination whether a first set of RS (Reference Signal) APs (Antenna Ports) are QCL-ed (Quasi Co-Located) with a second set of RS APs with respect to one or more large-scale channel properties and to select a set of receiving parameters for the second set of RS APs based on the one or more spatial receiver parameters. The one or more large-scale channel properties comprise one or more spatial receiver parameters. The first set of RS APs are distinct from the second set of RS APs.

20 Claims, 9 Drawing Sheets

Related U.S. Application Data

(60) Provisional application No. 62/365,875, filed on Jul. 22, 2016.

(51) Int. Cl.
  *H04L 5/00* (2006.01)
  *H04W 16/28* (2009.01)
  *H04W 64/00* (2009.01)
  *H04W 72/04* (2023.01)

(52) U.S. Cl.
  CPC .......... *H04W 16/28* (2013.01); *H04W 64/00* (2013.01); *H04W 72/042* (2013.01)

(56) References Cited

U.S. PATENT DOCUMENTS

| | | | |
|---|---|---|---|
| 2009/0016286 A1 | 1/2009 | Fajardo | |
| 2013/0064216 A1 | 3/2013 | Gao | |
| 2013/0279437 A1 | 10/2013 | Ng | |
| 2013/0301542 A1 | 11/2013 | Krishnamurthy et al. | |
| 2014/0036800 A1 | 2/2014 | Frenne | |
| 2014/0119266 A1* | 5/2014 | Ng | H04W 72/005 370/312 |
| 2014/0177745 A1 | 6/2014 | Krishnamurthy et al. | |
| 2014/0192917 A1 | 7/2014 | Nam et al. | |
| 2015/0173102 A1 | 6/2015 | Ruiz Delgado | |
| 2015/0201369 A1* | 7/2015 | Ng | H04W 48/12 370/254 |
| 2015/0207601 A1 | 7/2015 | Kim | |
| 2016/0142189 A1* | 5/2016 | Shin | H04B 7/0626 370/329 |
| 2016/0248562 A1* | 8/2016 | Nam | H04L 27/2601 |
| 2017/0302355 A1 | 10/2017 | Islam | |
| 2017/0331670 A1 | 11/2017 | Parkvall | |
| 2018/0352533 A1* | 12/2018 | Islam | H04W 72/0413 |
| 2019/0081688 A1 | 3/2019 | Deenoo | |

OTHER PUBLICATIONS

Non-Final Office Action dated May 21, 2020 in connection with U.S. Appl. No. 16/312,645.
Notice of Allowance dated Jan. 21, 2021 in connection with U.S. Appl. No. 16/312,645.
International Preliminary Report on Patentability dated Jan. 22, 2019 for PCT Application PCT/US2017/016695.

* cited by examiner

QCL (QUASI CO-LOCATION) INDICATION FOR BEAMFORMING MANAGEMENT

REFERENCE TO RELATED APPLICATIONS

This application is a continuation of U.S. application Ser. No. 16/312,645 filed Dec. 21, 2018, which is a National Phase entry application of International Patent Application No. PCT/US2017/016695 filed Feb. 6, 2017, which claims the benefit of U.S. Provisional Application No. 62/365,875 filed Jul. 22, 2016, entitled "QUASI CO-LOCATION INDICATION FOR BEAMFORMING MANAGEMENT", the contents of which are herein incorporated by reference in their entirety.

FIELD

The present disclosure relates to wireless technology, and more specifically to techniques for facilitating quasi co-location (QCL) assumptions and signaling in connection with beamforming.

BACKGROUND

As defined in LTE (Long Term Evolution), the antenna port is used for transmission of a physical channel or signal, where an antenna port is defined such that the channel over which a symbol on the antenna port is conveyed can be inferred from the channel over which another symbol on the same antenna port is conveyed. Different antenna ports can correspond to different reference signals, which can be used for channel estimation and processing of the physical channel transmitted on the same antenna ports.

DETAILED DESCRIPTION

Figure 1:
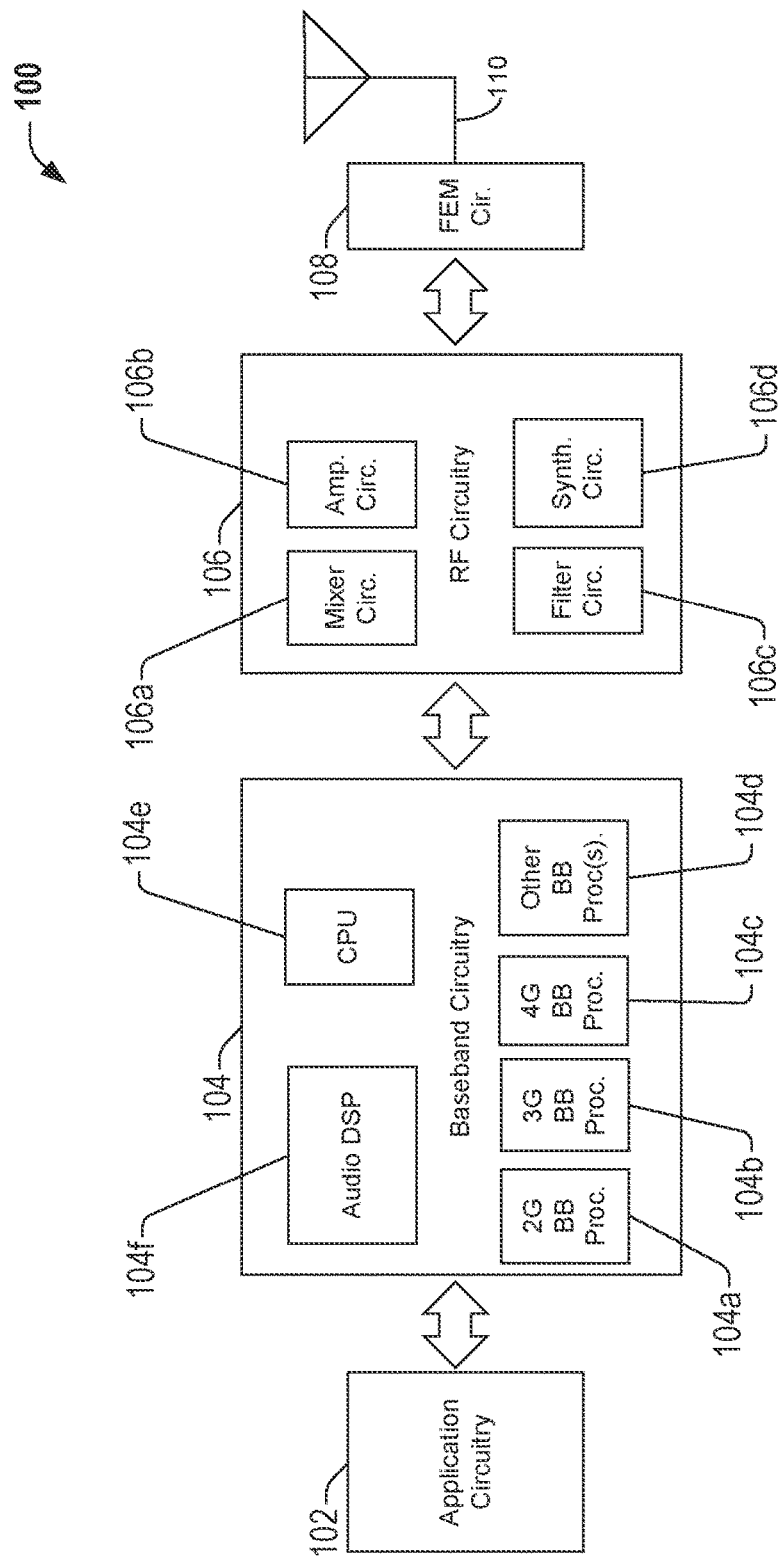
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106*d*. The amplifier circuitry 106*b* may be configured to amplify the down-converted signals and the filter circuitry 106*c* may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106*a* of the receive signal path may comprise passive mixers, although the scope of the embodiments is not limited in this respect.

In some embodiments, the mixer circuitry 106*a* of the transmit signal path may be configured to up-convert input baseband signals based on the synthesized frequency provided by the synthesizer circuitry 106*d* to generate RF output signals for the FEM circuitry 108. The baseband signals may be provided by the baseband circuitry 104 and may be filtered by filter circuitry 106*c*. The filter circuitry 106*c* may include a low-pass filter (LPF), although the scope of the embodiments is not limited in this respect.

In some embodiments, the mixer circuitry 106*a* of the receive signal path and the mixer circuitry 106*a* of the transmit signal path may include two or more mixers and may be arranged for quadrature downconversion and/or upconversion respectively. In some embodiments, the mixer circuitry 106*a* of the receive signal path and the mixer circuitry 106*a* of the transmit signal path may include two or more mixers and may be arranged for image rejection (e.g., Hartley image rejection). In some embodiments, the mixer circuitry 106*a* of the receive signal path and the mixer circuitry 106*a* may be arranged for direct downconversion and/or direct upconversion, respectively. In some embodiments, the mixer circuitry 106*a* of the receive signal path and the mixer circuitry 106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106*d* may be a fractional-N synthesizer or a fractional N/N+1 synthesizer, although the scope of the embodiments is not limited in this respect as other types of frequency synthesizers may be suitable. For example, synthesizer circuitry 106*d* may be a delta-sigma synthesizer, a frequency multiplier, or a synthesizer comprising a phase-locked loop with a frequency divider.

The synthesizer circuitry 106*d* may be configured to synthesize an output frequency for use by the mixer circuitry 106*a* of the RF circuitry 106 based on a frequency input and a divider control input. In some embodiments, the synthesizer circuitry 106*d* may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106*d* of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Additionally, although the above example discussion of device 100 is in the context of a UE device, in various aspects, a similar device can be employed in connection with a base station (BS) such as an Evolved NodeB (eNB), etc.

In LTE, antenna ports of the same or different reference signals can be quasi co-located. Two antenna ports are said to be quasi co-located (QCL) if the large-scale properties of the channel over which a symbol on one antenna port is conveyed can be inferred from the channel over which a symbol on the other antenna port is conveyed.

The large-scale properties for LTE include one or more of: (a) Average delay (first-order statistics for the time property of the channel); (b) Delay spread (second-order statistics for the time property of the channel); (c) Doppler shift (first-order statistics for the frequency property of the channel); (d) Doppler spread (second-order statistics for the frequency property of the channel); (e) Average gain (first-order statistics for the amplitude property of the channel)

The large-scale properties estimated on antenna ports of reference signals can be used to parametrize the channel estimator, compensate possible time and frequency errors when deriving CSI (Channel State Information) feedback or when performing demodulation.

Figure 2:
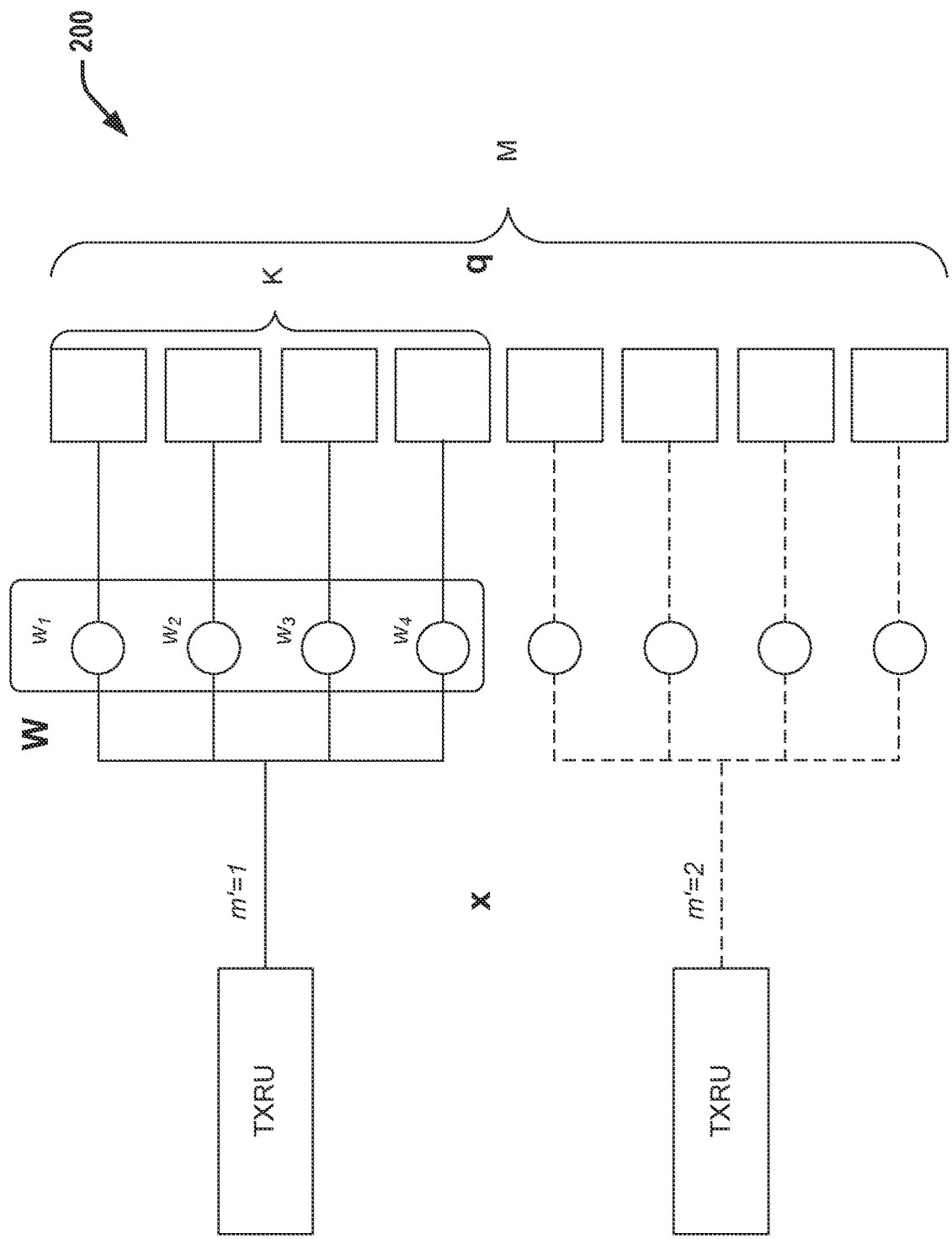
FIG. 2 is a diagram illustrating an antenna sub-array model that can be employed in connection with various aspects discussed herein.

Referring to FIG. 2, illustrated is a diagram showing an antenna sub-array model 200 that can be employed in connection with various aspects discussed herein. For ease of illustration, two transceiver units (TXRUs) and eight physical antennas (M=8) are shown (with four physical antennas per subarray (K=4) in model 200) for model 200, although in various embodiments, each of these values can be greater or lesser. As can be seen in FIG. 2, model 200 comprises distinct subarrays, with each physical antenna part of a distinct subarray and associated with a single distinct TXRU (e.g., m'=1 or m'=2). The 5G (Fifth Generation) NR (New Radio) antenna design can be largely based on the antenna sub-array concept, such as the example model 200 of FIG. 2.

The physical antenna elements of the TRP (Transmission/Reception Point, e.g., Base Station such as an eNB (Evolved NodeB), etc.)/UE can be grouped into antenna sub-arrays, where an antenna array can contain multiple subarrays. The physical antenna elements of the antenna sub-array can be virtualized to the antenna port(s) using analog beamforming.

The analog beamforming can be used to improve the performance of the communication link between TRP and UE. The analog beamforming at the TRP and UE can be trained by transmitting a series of reference signals with different beamforming. The UE can also train the receive beamforming. The optimal analog beamforming at the UE can depend on the beamforming at the TRP and vice versa. Multiple optimal beam combinations at the TRP and UE can be established for possible communication. A beam training on one antenna subarray can be reused on another antenna subarray.

FIG. 2 shows a subarray antenna architecture with two subarrays, where each subarray may have different analog beamforming. The analog beamforming is controlled by antenna weights $w_i$ (which can be complex valued (to control amplitude and phase) elements of a weight vector W).

In conventional LTE procedures, "the same beam information" can be used to convey information about transmit beamforming. However, the "same beam" information can be ambiguous when single and multiple subarrays are considered at the TRP. More specifically, if multiple subarrays are used, the same beam information can imply either the same channel on antenna ports if the reference signals are transmitted from the same subarray, or a different channel on antenna ports if the reference signals are transmitted from a different subarray but with the same beamforming. In addition, the same beamforming forces specific NW (network) behavior which can be detrimental. Instead of describing beamforming schemes used at the TRP, in aspects discussed herein, new quasi co-location parameters and assumption that a UE can employ to determine the receive beamforming.

In various embodiments, additional quasi co-location parameters introduced herein can be used to convey information about the spatial properties of the channel at the receiver (e.g., at a UE receiver). The provided information about spatial channel properties can be used to assist beamforming selection at the receiver. The proposed new quasi co-location parameters can comprise: (a) Average angle-of-arrival (first-order statistics for the angle property of the channel); (b) Angle of arrival spread (second-order statistics for the angle property of the channel).

In various aspects, the quasi co-location assumption can be used in beamforming training procedure so that the receive beamforming estimated on one antenna port can be reused on other antenna port(s) if quasi co-location is established between antenna ports.

In various aspects, a quasi co-location assumption as discussed herein can be signaled or fixed (e.g., in the relevant specification). In aspects that employ signaling, RRC (Radio Resource Control), MAC (Media Access Control) or physical layer (e.g., DCI (Downlink Control Information)) signaling can be introduced. For example, a set of beam training reference signals transmitted using different transmit beamforming can be used in the network.

In a first set of embodiments, for data reception, the receive beamforming can be indicated to the UE by indicating the quasi co-location between DM-RS (DeModulation Reference Signal) antenna ports used to transmit PDSCH (Physical Downlink Shared CHannel) and antenna ports of beam training reference signals. As one example, DCI containing information about PDSCH can include the index or ID of one of the beam reference signal that was used to train the receive beamforming at the UE. The antenna port(s) of the beam training reference signal can be assumed to be quasi co-located with the antenna port(s) of DM-RS and PDSCH scheduled by a given DCI with respect to average angle-of-arrival and angle of arrival spread. In various examples, the beam training reference signal can be Channel State Information Reference Signal (CSI-RS) or Mobility Reference Signals (MRS) or other type of reference signal defined for beam training at the UE.

In a second set of embodiments, the control channel can be configured with the index or ID of the beam training reference signal. The antenna ports of the beam training reference signal can be assumed to be quasi co-located with DM-RS antenna ports of control channel with respect to average angle-of-arrival and angle of arrival spread. In various aspects, the beam training reference signal can be Channel State Information Reference Signal (CSI-RS) or Mobility Reference Signals (MRS) or other type of reference signal defined for beam training at the UE.

In a third set of embodiments, no quasi co-location can be established for DM-RS antenna ports of the control channel or PDSCH, which can facilitate omni-directional or near omni-directional (referred to herein as "quasi-omni-directional") reception of a control channel and/or data channel at the UE.

Figure 3:
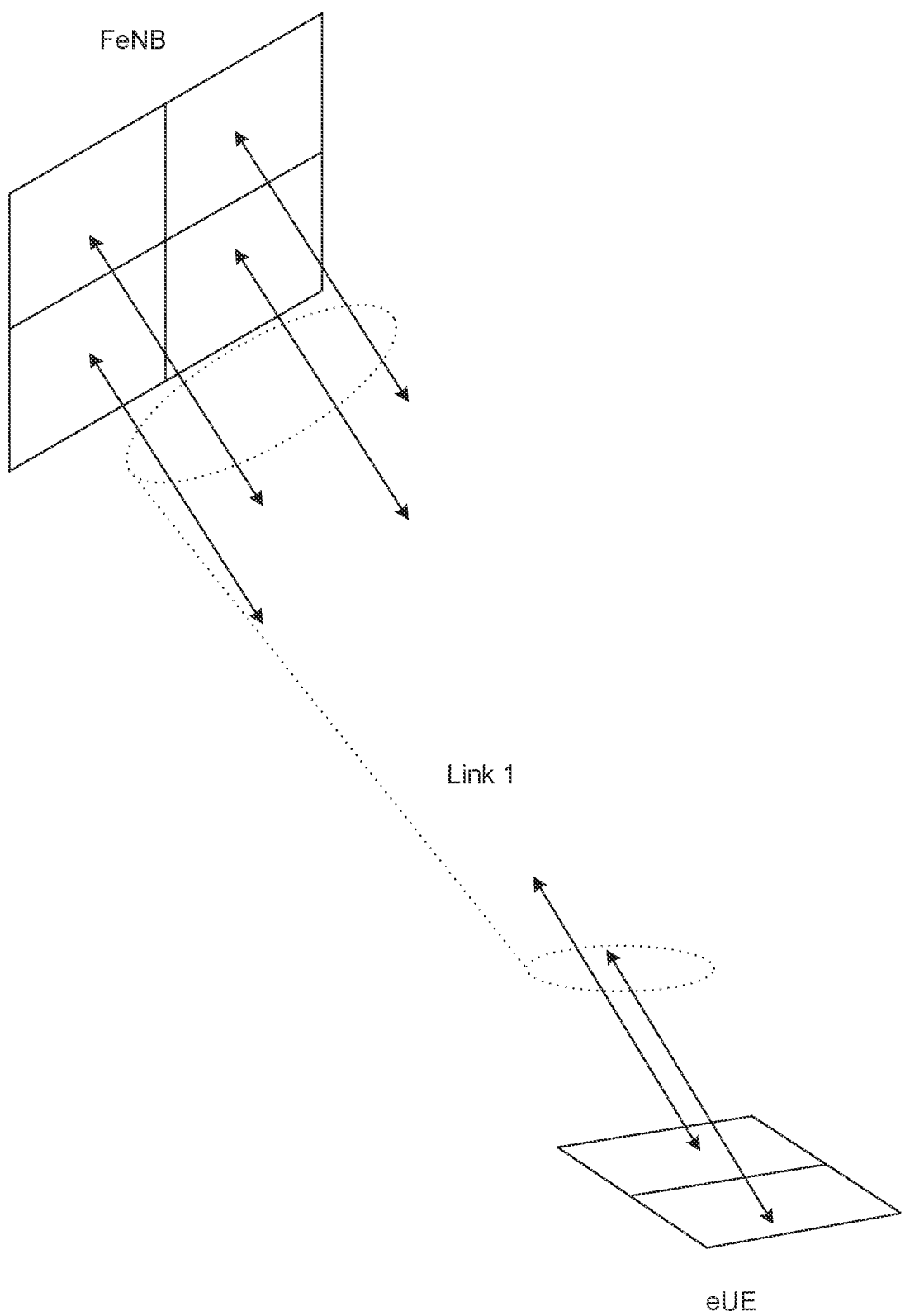
FIG. 3 is a diagram illustrating an example scenario involving single beam operation, wherein all DM-RS antenna ports transmitted by the TRP can be assumed to be quasi co-located with respect to angle-of-arrival and angle of arrival spread, in connection with various aspects discussed herein.

Quasi co-location signaling according to aspects discussed herein also can be applied for the antenna ports of the same reference signals. As an example, FIG. 3 illustrates an example scenario involving single beam operation, wherein all DM-RS antenna ports transmitted by the TRP can be assumed to be quasi co-located with respect to angle-of-arrival and angle of arrival spread, in connection with various aspects discussed herein. In a fourth set of embodiments, all DM-RS antenna ports transmitted by the TRP can be quasi co-located with the antenna ports of the same beam training reference signal with respect to angle-of-arrival and angle of arrival spread.

Figure 4:
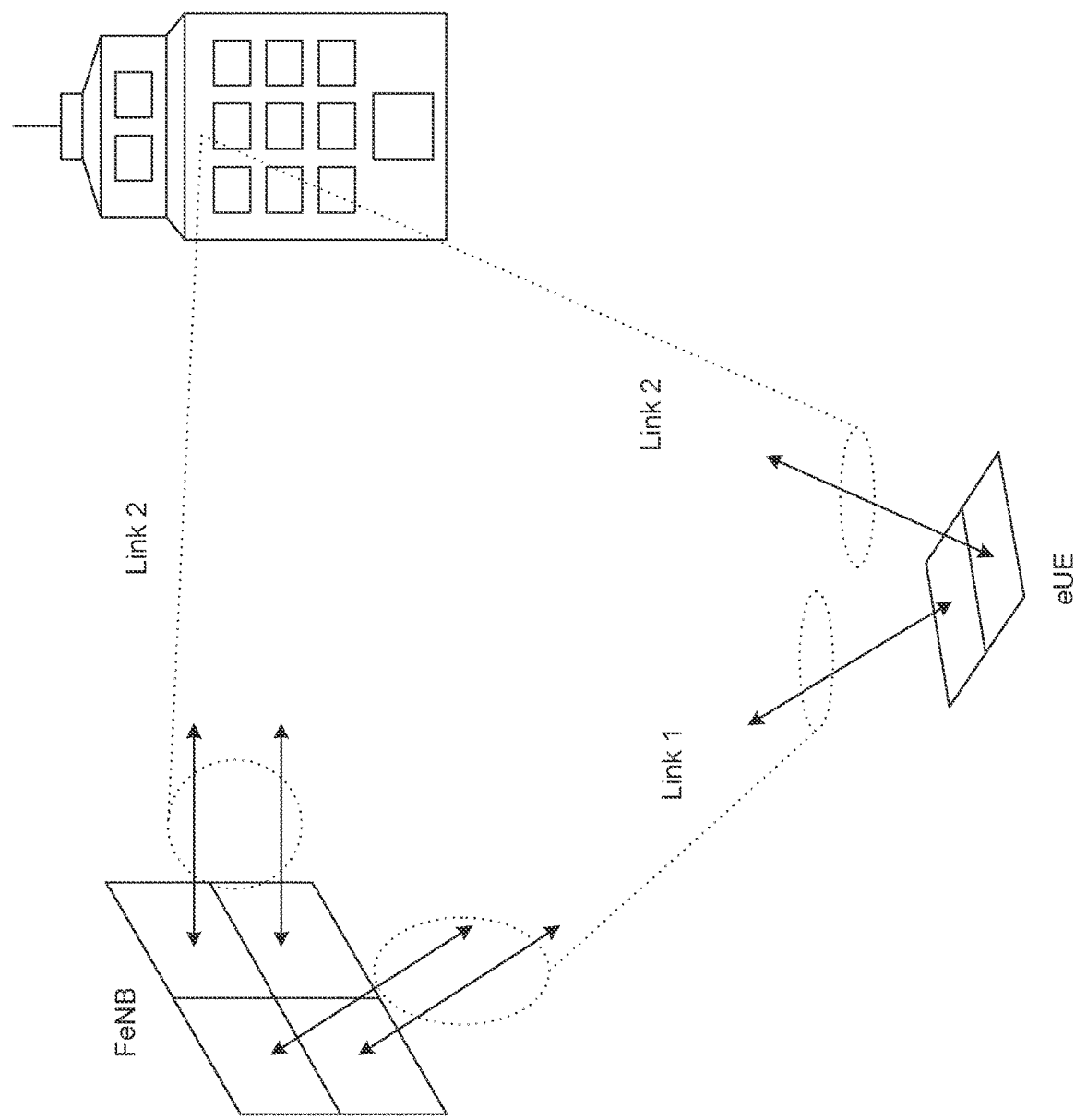
FIG. 4 is a diagram illustrating an example scenario involving multi-beam operation wherein a first and second set of DM-RS antenna ports transmitted by a single TRP can be considered not quasi co-located with respect to average angle of arrival and angle of arrival spread, according to various aspects discussed herein.
Figure 5:
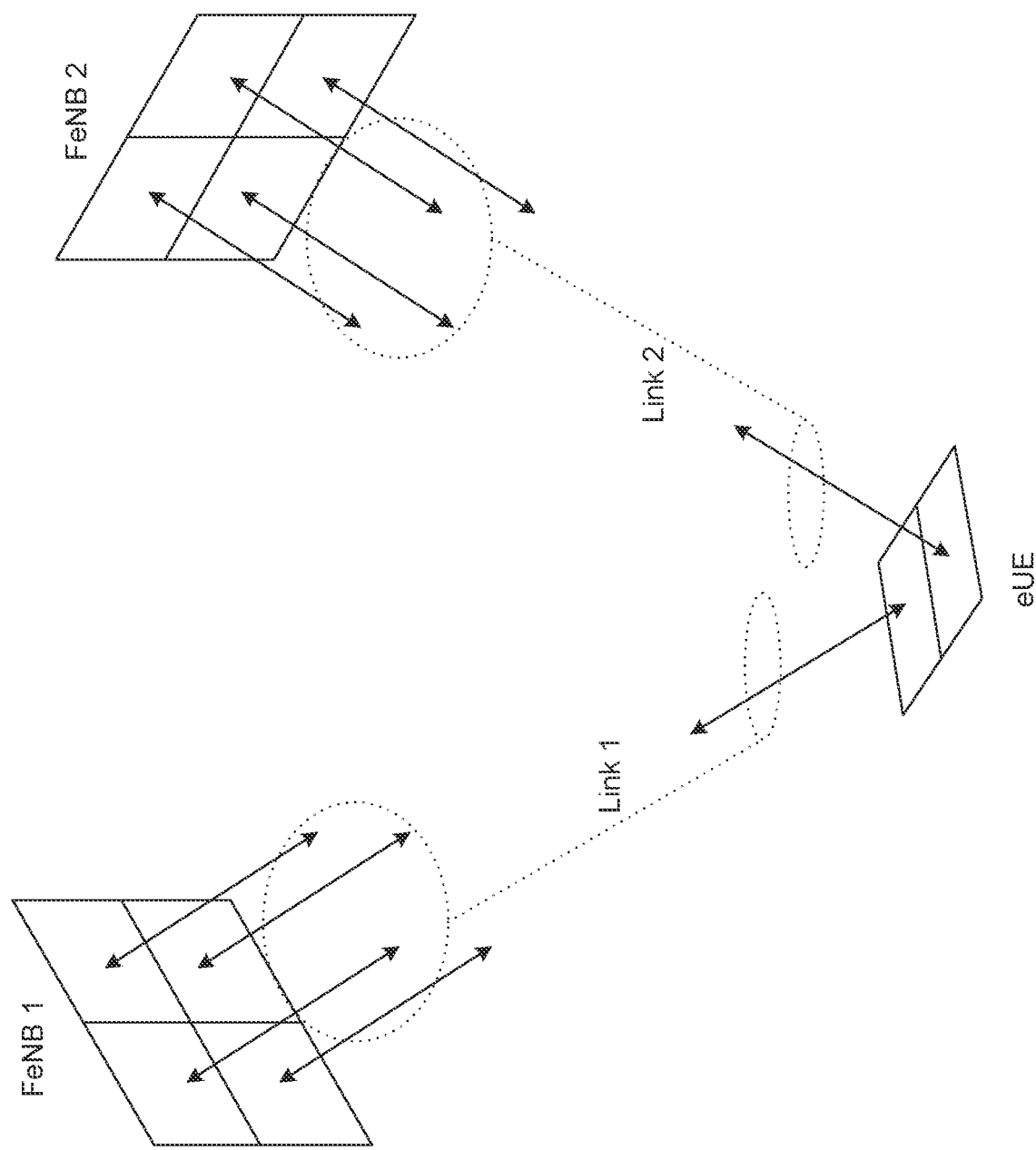
FIG. 5 is an example scenario involving multi-beam operation wherein a first and second set of DM-RS antenna ports transmitted by distinct TRPs can be considered not quasi co-located with respect to average angle of arrival and angle of arrival spread, according to various aspects discussed herein.

Referring to FIG. 4, illustrated is an example scenario involving multi-beam operation wherein a first and second set of DM-RS antenna ports transmitted by a single TRP can be considered not quasi co-located with respect to average angle of arrival and angle of arrival spread, according to various aspects discussed herein. Referring to FIG. 5, illustrated is an example scenario involving multi-beam operation wherein a first and second set of DM-RS antenna ports transmitted by distinct TRPs can be considered not quasi co-located with respect to average angle of arrival and angle of arrival spread, according to various aspects discussed herein. For multi beam operation (e.g., the scenarios of FIG. 4 or 5), one set of DM-RS antenna ports and another set of DM-RS antenna ports transmitted by the same or a different TRP can be assumed to be not quasi co-located with respect to angle-of-arrival and angle of arrival spread. In such embodiments, the quasi co-location assumption of the beam training reference signals with respect to angle-of-arrival and angle of arrival spread can be established with a subset of the DM-RS antenna ports. The quasi co-location can be established via signaling, such as DCI, RRC, MAC, or a combination thereof.

Figure 6:
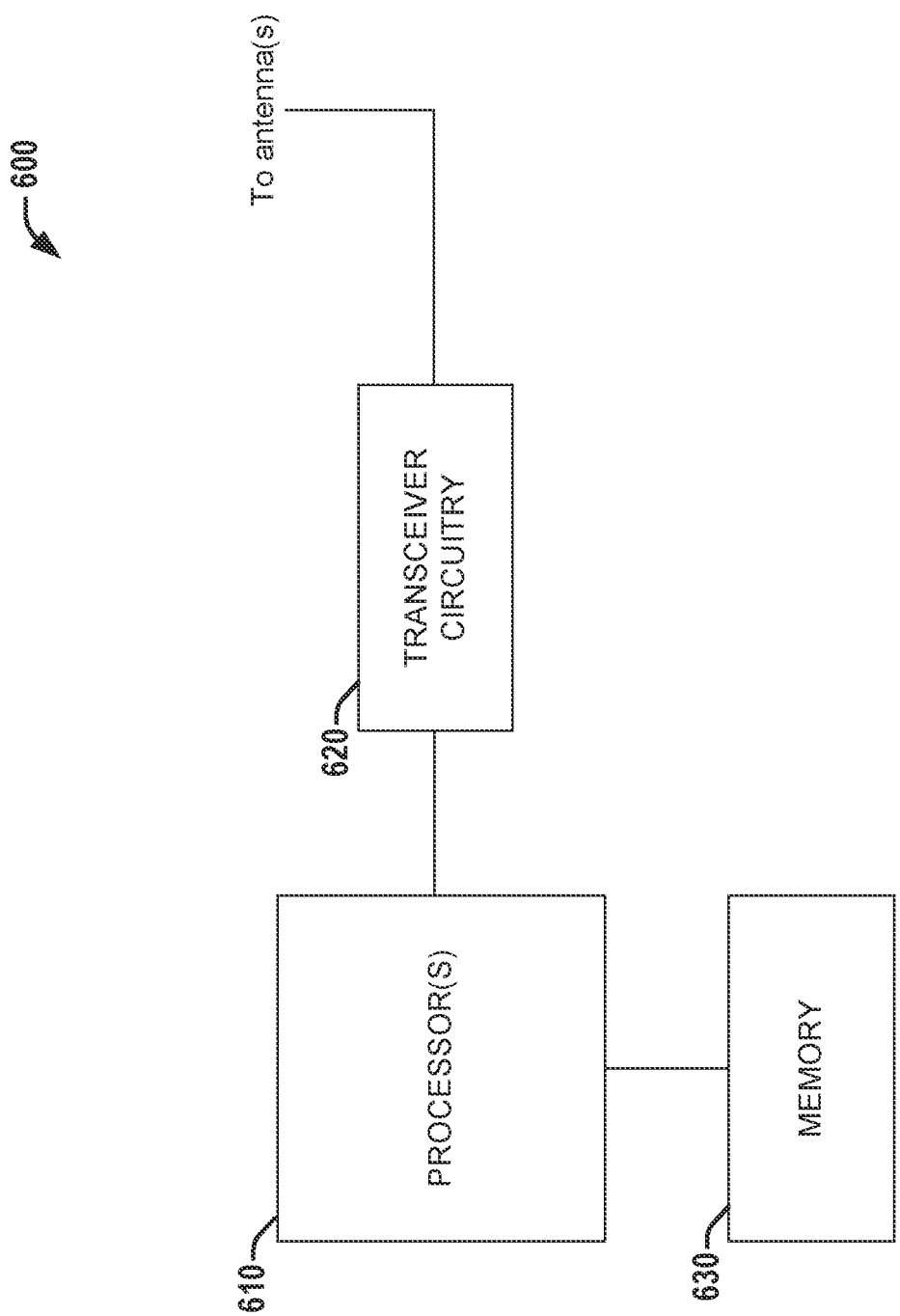
FIG. 6 is a block diagram illustrating a system that facilitates determination at a UE (user equipment) of whether RS (reference signal) APs (antenna ports) are co-scheduled with one another with respect to average angle of arrival and angle of arrival spread, according to various aspects described herein.

Referring to FIG. 6, illustrated is a block diagram of a system 600 that facilitates determination at a UE (user equipment) of whether RS (reference signal) APs (antenna ports) are co-scheduled with one another with respect to average angle of arrival and angle of arrival spread, according to various aspects described herein. System 600 can include one or more processors 610 (e.g., one or more baseband processors such as one or more of the baseband processors discussed in connection with FIG. 1), transceiver circuitry 620 (e.g., comprising one or more of transmitter circuitry or receiver circuitry, which can employ common circuit elements, distinct circuit elements, or a combination thereof), and a memory 630 (which can comprise any of a variety of storage mediums and can store instructions and/or data associated with one or more of processor(s) 610 or transceiver circuitry 620). In various aspects, system 600 can be included within a user equipment (UE). As described in greater detail below, system 600 can determine whether a first set of RS APs (e.g., a set of beam training reference signals, a first set of DM-RS APs, etc.) and a second set of RS APs (e.g., a set of DM-RS APs, a second set of DM-RS APs, etc.) have similar or distinct angle-of-arrival statistics, and select beamforming weights based on that determination.

Processor(s) 610 can determine whether a first set of RS APs are QCL-ed with a second set of RS APs, via techniques that can vary depending on the embodiment.

For example, in a first set of embodiments, processor(s) 610 can determine whether the first and second sets of RS APs are QCL-ed based on a predefined relationship (e.g., in a specification, etc.) between the first and second sets of RS APs.

As another example, in a second set of embodiments, transceiver circuitry 620 can receive, and processor(s) 610 can process, QCL signaling that indicates whether the first set of RS APs and the second set of RS APs are QCL-ed with respect to one or more spatial large-scale channel properties, such as angle-of-arrival statistics (e.g., average angle of arrival and/or angle of arrival spread), and/or other large-scale channel properties (e.g., average delay, delay spread, Doppler shift, Doppler spread, and/or average gain). Depending on the type of received signal or message, processing (e.g., by processor(s) 610, processor(s) 710, etc.) can comprise one or more of: identifying physical resources associated with the signal/message, detecting the signal/message, resource element group deinterleaving, demodulation, descrambling, and/or decoding. In some aspects, the QCL signaling can comprise DCI (Downlink Control Information) message(s) that processor(s) 610 can decode. In the same or other aspects, the QCL signaling can comprise higher layer signaling (e.g, RRC (Radio Resource Control) and/or MAC (Media Access Control) signaling).

In aspects wherein QCL signaling is employed, the QCL signaling can indicate, explicitly or implicitly, a QCL type (e.g., QCL-ed or non-QCL-ed with respect to the large-scale channel properties such as angle-of-arrival statistics) between the first set of RS APs and the second set of RS APs with respect to angle-of-arrival statistics, etc. In such aspects, processor(s) 610 can determine whether the first and second sets of RS APs are QCL-ed with respect to angle-of-arrival statistics, etc., based on the indicated type. For example, the QCL signaling can indicate, for a first set of RS APs (e.g., associated with beam training reference signal(s), etc.), which other RS APs (e.g., which DM-RS APs associated with data and/or control signaling, etc.) are QCL-ed with the first set of RS APs with respect to the angle-of-arrival statistics (e.g., first order (average angle of arrival) and second order (angle of arrival spread)), etc. In various aspects, the QCL signaling can indicate one or more IDs or indices associated with reference signals (and corresponding RS APs) that are QCL-ed with the first set of RS APs. In such aspects, all non-indicated reference signals can be implicitly indicated to be non-QCL-ed with the first set of RS APs with respect to first and second order angle-of-arrival statistics, etc.

If processor(s) 610 determine that the second set of RS APs are QCL-ed with the first set of RS APs (e.g., or with some other set of RS APs for which known (e.g., trained) beamforming weights exist) with respect to angle-of-arrival statistics, processor(s) 610 can select the known (e.g., trained) beamforming weights of the first (or other QCL-ed) set of RS APs for the second set of RS APs. In such a scenario, communication circuitry 620 can employ the selected (known) beamforming weights to receive data and/or control signaling via the second set of RS APs.

If processor(s) 610 determine that the second set of RS APs are non-QCL-ed with the first set of RS APs (e.g., and non-QCL-ed with any other set of RS APs for which known (e.g., trained) beamforming weights exist) with respect to angle-of-arrival statistics (e.g., average angle of arrival and angle of arrival spread), processor(s) 610 can select a quasi-omni-directional (e.g., an omni-directional or near-omni-directional) set of beamforming weights for the second set of RS APs. In such a scenario, communication circuitry 620 can employ the selected (quasi-omni-directional) beamforming weights to receive data and/or control signaling via the second set of RS APs (e.g., DM-RS APs).

Figure 7:
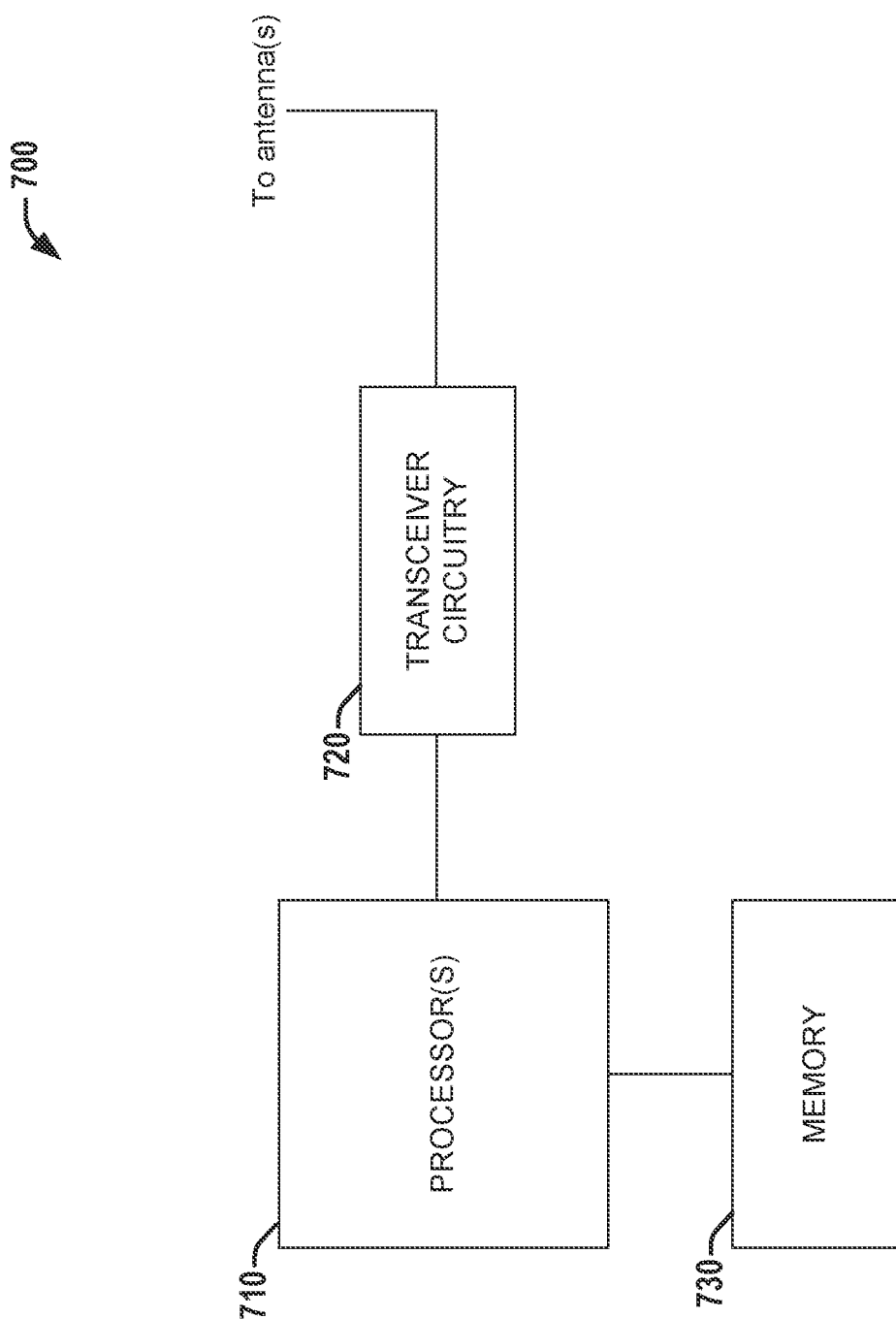
FIG. 7 is a block diagram illustrating a system that facilitates indication by a base station of QCL (Quasi-Co-Location) with respect to angle-of-arrival statistics between sets of RS (Reference Signals), according to various aspects described herein.

Referring to FIG. 7, illustrated is a block diagram of a system 700 at a base station that facilitates indication of QCL (Quasi-Co-Location) with respect to angle-of-arrival statistics between sets of RS (Reference Signals), according to various aspects described herein. System 700 can include one or more processors 710 (e.g., one or more baseband processors such as one or more of the baseband processors discussed in connection with FIG. 1), transceiver circuitry 720 (e.g., which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 730 (which can comprise any of a variety of storage mediums and can store instructions and/or data associated with one or more of processor(s) 710 or transceiver circuitry 720). In various aspects, system 700 can be included within an Evolved Universal Terrestrial Radio Access Network (E-UTRAN) Node B (Evolved Node B, eNodeB, or eNB), generation Node B (gNodeB) or other base station in a wireless communications network. In some aspects, the processor(s) 710, transceiver circuitry 720, and the memory 730 can be included in a single device, while in other aspects, they can be included in different devices, such as part of a distributed architecture. As described in greater detail below, system 700 can facilitate signaling that can assist a UE in determining beamforming weights to apply for set(s) of RS APs.

Processor(s) 710 can determine whether a first set of RS APs (e.g., associated with beam training reference signal(s)) are QCL-ed with a second set of RS APs (e.g., DM-RS APs associated with data and/or control signaling) with respect to angle-of-arrival statistics (e.g., and possibly other large-scale channel properties, such as average delay, delay spread, Doppler shift, Doppler spread, average gain, etc.), for example by determining any RS APs that are QCL-ed with the first set of RS APs.

Based on the determination of which RS APs (e.g., whether or not the second set of RS APs is) that are QCL-ed with the first set of RS APs, processor(s) 710 can generate QCL signaling (e.g., DCI, RRC, and/or MAC) that can indicate a QCL type for each of one or more RS APs (e.g., indicating whether that RS AP is QCL-ed with the first set of RS APs with respect to angle-of-arrival statistics, etc.), either explicitly or implicitly. As one example, each RS AP for which the QCL signaling comprises an associated ID or index can be explicitly indicated as QCL-ed with the first set of RS APs with respect to angle-of-arrival statistics, etc. In the same example, all RS APs for which the QCL signaling does not comprise an associated ID or index can be implicitly indicated as non-QCL-ed with the first set of RS APs with respect to angle-of-arrival statistics, etc.

Processor(s) 710 can output the QCL signaling to communication circuitry 720, which can send the QCL signaling to a UE, indicating whether RS APs are QCL-ed with the first set of RS APs with respect to average angle of arrival, angle of arrival spread, and possibly other large-scale channel statistics. Depending on the type of signal or message generated, outputting for transmission (e.g., by processor(s) 610, processor(s) 710, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.).

Figure 8:
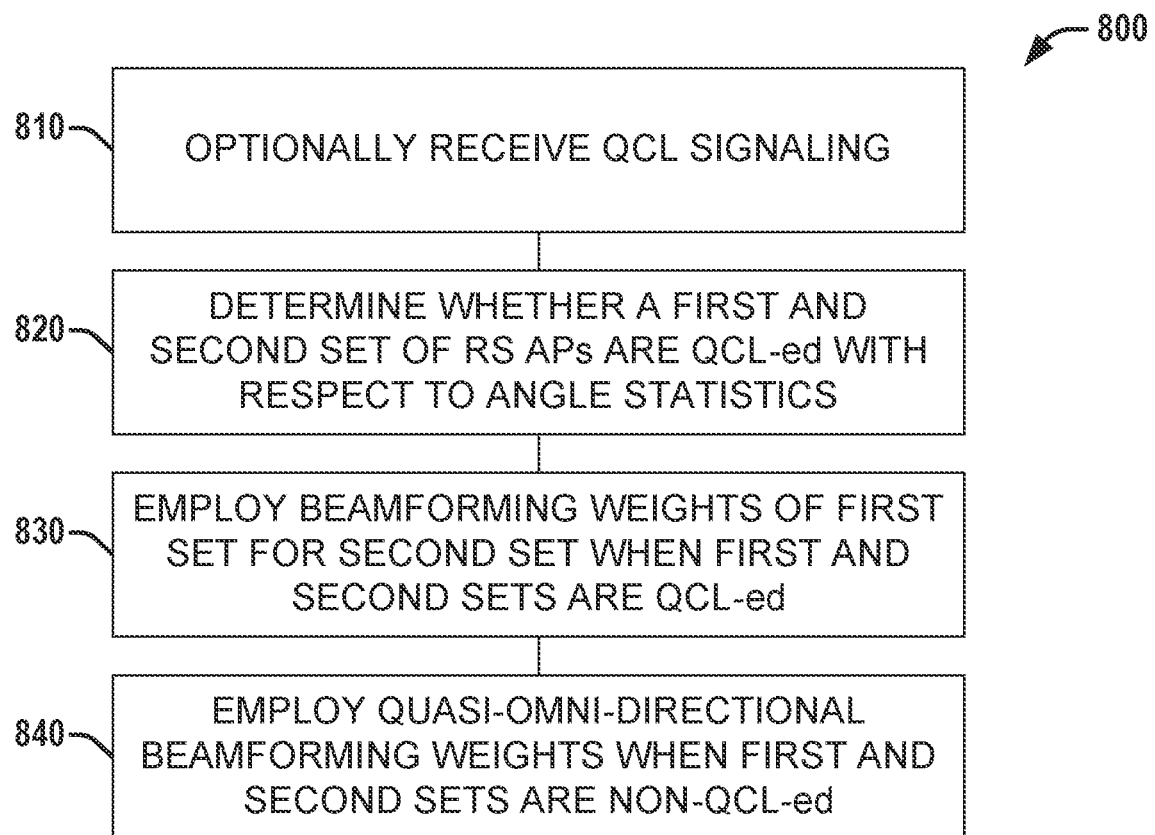
FIG. 8 is a flow diagram illustrating a method that facilitates determination by a UE of whether a first set of RS APs are QCL-ed with a second set of RS APs with respect to average angle of arrival and angle of arrival spread, according to various aspects described herein.

Referring to FIG. 8, illustrated is a flow diagram of a method 800 that facilitates determination by a UE of whether a first set of RS APs are QCL-ed with a second set of RS APs with respect to average angle of arrival and angle of arrival spread, according to various aspects described herein. In some aspects, method 800 can be performed at a UE. In other aspects, a machine readable medium can store instructions associated with method 800 that, when executed, can cause a UE to perform the acts of method 800.

At 810, optionally, QCL signaling can be received from a base station that can indicate RS APs (e.g., DM-RS APs, etc.) that are QCL-ed with a first set of RS APs (e.g., associated with a beam training reference signal, etc.) with respect to angle-of-arrival statistics (angle statistics).

At 820, a determination can be made as to whether a second set of RS APs (e.g., DM-RS APs) are QCL-ed with the first set of RS APs with respect to angle-of-arrival statistics. In some aspects, this determination can be based on QCL signaling received at 810, while in other aspects, the determination can be based on predefined relationships between RS APs (e.g., in a specification).

At 830, if the first and second sets of RS APs are QCL-ed with respect to angle-of-arrival statistics, a set of beamforming weights of the first set of RS APs can be employed for the second set of RS APs.

At 840, if the first and second sets of RS APs are non-QCL-ed with respect to angle-of-arrival statistics, a set of quasi-omni-directional beamforming weights can be employed for the second set of RS APs.

Additionally or alternatively, method 800 can include one or more other acts described above in connection with system 600.

Figure 9:
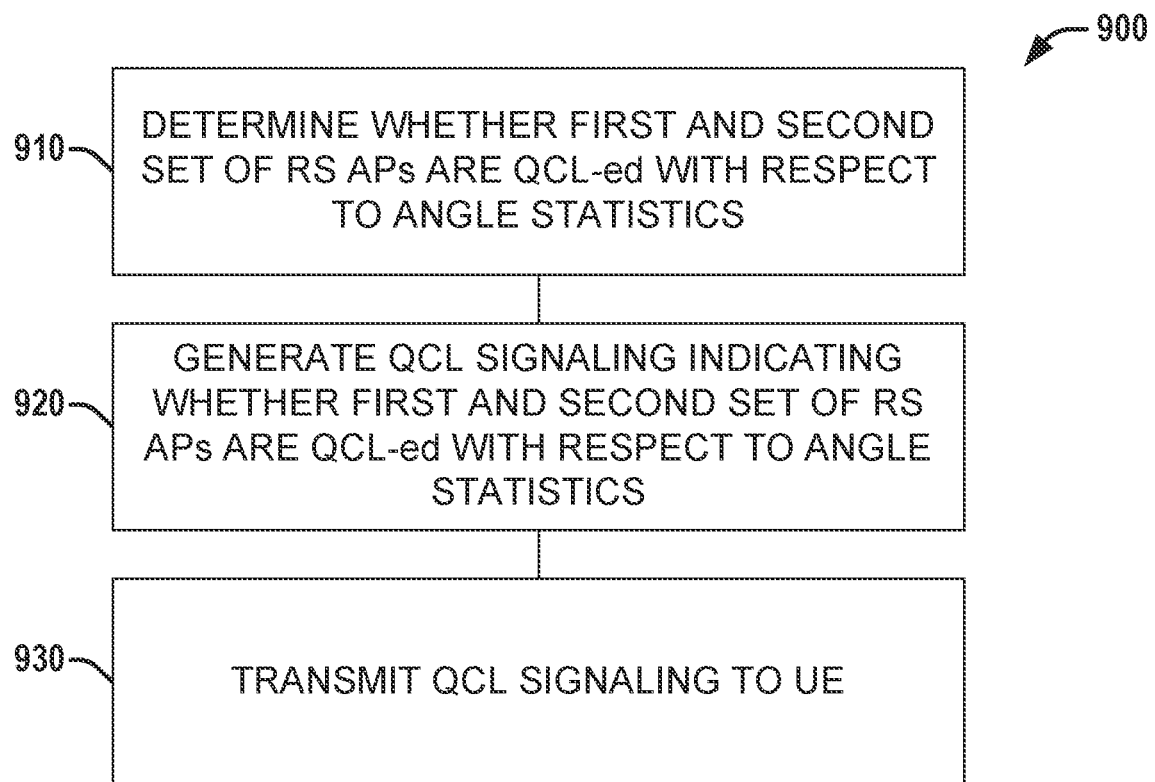
FIG. 9 is a flow diagram illustrating a method that facilitates generation of signaling by a base station that indicates whether RS AP(s) are QCL-ed with one another with respect to angle-of-arrival statistics, according to various aspects described herein.

Referring to FIG. 9, illustrated is a flow diagram of a method 800 that facilitates generation of signaling by a base station that indicates whether RS AP(s) are QCL-ed with one another with respect to angle-of-arrival statistics, according to various aspects described herein. In some aspects, method 900 can be performed at an eNB. In other aspects, a machine readable medium can store instructions associated with method 900 that, when executed, can cause an eNB to perform the acts of method 900.

At 910, a determination can be made whether a first set of RS APs and a second set of RS APs are QCL-ed with respect to angle-of-arrival statistics (angle statistics). For RS APs originating from distinct TRPs, they can be determined to be non-QCL-ed. For RS APs originating from a common TRP, they can be determined to be QCL-ed if the same beamforming weights are applied to each.

At 920, QCL signaling can be generated indicating whether the first and second sets of RS APs are QCL-ed with respect to angle-of-arrival statistics.

At 930, the QCL signaling can be transmitted to a UE to assist in receive beamforming.

Additionally or alternatively, method 900 can include one or more other acts described above in connection with system 700.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within a User Equipment (UE), comprising: a memory; and one or more processors configured to: make a determination whether a first set of RS (Reference Signal) APs (Antenna Ports) are QCL-ed (Quasi Co-Located) with a second set of RS APs with respect to one or more large-scale channel properties, wherein the one or more large-scale channel properties comprise one or more spatial channel properties, and wherein the first set of RS APs are distinct from the second set of RS APs; and select, based on the determination, a set of beamforming weights for reception via the second set of RS APs.

Example 2 comprises the subject matter of any variation of any of example(s) 1, wherein the one or more spatial channel properties comprise an average angle-of-arrival and an angle of arrival spread.

Example 3 comprises the subject matter of any variation of any of example(s) 1, wherein the one or more processors are configured to make the determination based on a predefined relationship between the first set of RS APs and the second set of RS APs.

Example 4 comprises the subject matter of any variation of any of example(s) 1, wherein the one or more processors are further configured to: process QCL signaling that indicates a QCL type between the first set of RS APs and the second set of RS APs; and make the determination based on the indicated QCL type.

Example 5 comprises the subject matter of any variation of any of example(s) 4, wherein the QCL signaling comprises DCI (Downlink Control Information) messaging, wherein the second set of RS APs are a set of DM (Demodulation)-RS APs associated with a PDSCH (Physical Downlink Shared Channel), wherein the one or more processors are further configured to decode the DCI messaging, and wherein the memory is configured to store at least one DCI message of the DCI messaging.

Example 6 comprises the subject matter of any variation of any of example(s) 4, wherein the QCL signaling comprises one or more of RRC (Radio Resource Control) signaling or MAC (Media Access Control) signaling, and wherein the memory is configured to store at least one RRC message associated with the RRC signaling or at least one MAC message associated with the MAC signaling.

Example 7 comprises the subject matter of any variation of any of example(s) 4, wherein the QCL signaling indicates one or more reference signals that are QCL-ed with the first set of RS APs with respect to the one or more large-scale channel properties, wherein the QCL signaling indicates the one or more reference signals via one or more identifiers or indices associated with the one or more reference signals.

Example 8 comprises the subject matter of any variation of any of example(s) 1-7, wherein the one or more processors are configured to make the determination that the first set of RS APs are QCL-ed with the second set of RS APs with respect to the one or more large-scale channel properties, and wherein the one or more processors are configured to select, based on the determination, a first set of beamforming weights associated with the first set of RS APs as the set of beamforming weights for reception via the second set of RS APs.

Example 9 comprises the subject matter of any variation of any of example(s) 1-7, wherein the one or more processors are configured to make the determination that the first set of RS APs are non-QCL-ed with the second set of RS APs with respect to the one or more large-scale channel properties.

Example 10 comprises the subject matter of any variation of any of example(s) 9, wherein the one or more processors are further configured to select the set of beamforming weights for reception via the second set of RS APs to facilitate quasi-omni-directional reception via the second set of RS APs.

Example 11 comprises the subject matter of any variation of any of example(s) 1-7, wherein the one or more large-scale channel properties comprise one or more of: an average delay, a delay spread, a Doppler shift, a Doppler spread, or an average gain.

Example 12 comprises the subject matter of any variation of any of example(s) 1-7, wherein the first set of RS APs comprise a set of beam training RS APs, wherein the set of beam training RS APs comprises one or more of CSI (Channel State Information)-RS APs or MRS (Mobility RS) APs.

Example 13 comprises the subject matter of any variation of any of example(s) 1-2, wherein the one or more processors are configured to make the determination based on a predefined relationship between the first set of RS APs and the second set of RS APs.

Example 14 comprises the subject matter of any variation of any of example(s) 4-6, wherein the QCL signaling indicates one or more reference signals that are QCL-ed with the first set of RS APs with respect to the one or more large-scale channel properties, wherein the QCL signaling indicates the one or more reference signals via one or more identifiers or indices associated with the one or more reference signals.

Example 15 comprises the subject matter of any variation of any of example(s) 1-10, wherein the one or more large-scale channel properties comprise one or more of: an average delay, a delay spread, a Doppler shift, a Doppler spread, or an average gain.

Example 16 comprises the subject matter of any variation of any of example(s) 1-11, wherein the first set of RS APs comprise a set of beam training RS APs, wherein the set of beam training RS APs comprises one or more of CSI (Channel State Information)-RS APs or MRS (Mobility RS) APs.

Example 17 is an apparatus configured to be employed within an Evolved NodeB (eNB), comprising: a memory; and one or more processors configured to: determine whether a first set of RS (Reference Signal) APs (Antenna Ports) associated with a User Equipment (UE) and a distinct second set of RS APs associated with the UE are QCL-ed (Quasi Co-Located) with respect to one or more large-scale channel properties, wherein the one or more large-scale channel properties comprise an average angle-of-arrival and an angle of arrival spread; and generate QCL signaling that indicates whether the first set of RS APs are QCL-ed with the second set of RS APs with respect to the one or more large-scale channel properties.

Example 17 comprises the subject matter of any variation of any of example(s) 16, wherein the QCL signaling indicates one or more identifiers or indices, wherein the one or more identifiers or indices are associated with one or more reference signals that are QCL-ed with the first set of RS APs with respect to the one or more large-scale channel properties.

Example 18 comprises the subject matter of any variation of any of example(s) 16, wherein the QCL signaling comprises one or more DCI (Downlink Control Information) messages, wherein the second set of RS APs comprise a set of DM-RS APs associated with a PDSCH (Physical Downlink Shared Channel), wherein the one or more processors are further configured to encode the one or more DCI messages and wherein the memory is configured to store the one or more DCI messages.

Example 19 comprises the subject matter of any variation of any of example(s) 16, wherein the QCL signaling comprises RRC (Radio Resource Control) signaling, and wherein the memory is configured to store at least one RRC message associated with the RRC signaling.

Example 20 comprises the subject matter of any variation of any of example(s) 16, wherein the QCL signaling comprises MAC (Media Access Control) signaling, and wherein the memory is configured to store at least one MAC message associated with the MAC signaling.

Example 21 comprises the subject matter of any variation of any of example(s) 16-20, wherein the first set of RS APs comprise a set of beam training RS APs, wherein the set of beam training RS APs are one of a set of CSI (Channel State Information)-RS APs or a set of MRS (Mobility RS) APs.

Example 22 comprises the subject matter of any variation of any of example(s) 16-20, wherein the one or more large-scale channel properties comprise one or more of: an average delay, a delay spread, a Doppler shift, a Doppler spread, or an average gain.

Example 23 is a machine readable medium comprising instructions that, when executed, cause a User Equipment (UE) to: receive QCL (Quasi Co-Location) signaling that indicates a QCL type between a first set of RS (Reference Signal) APs (Antenna Ports) and a distinct second set of RS APs; determine, based on the QCL type, whether the first set of RS APs are QCL-ed (Quasi Co-Located) with the second set of RS APs with respect to an average angle of arrival and an angle of arrival spread; in response to a determination that the first set of RS APs are QCL-ed with the second set of RS APs with respect to the average angle of arrival and the angle of arrival spread, employ a common set of beamforming weights for beamformed reception of a first set of signals associated with the first set of RS APs and for beamformed reception of a second set of signals associated with the second set of RS APs; and in response to a determination that the first set of RS APs are non-QCL-ed with the second set of RS APs with respect to the average angle of arrival and the angle of arrival spread, employ a quasi-omni-directional set of beamforming weights for quasi-omni-directional reception of the second set of signals associated with the second set of RS APs.

Example 24 comprises the subject matter of any variation of any of example(s) 23, wherein the QCL signaling comprises one or more DCI (Downlink Control Information) messages, wherein the second set of RS APs are a set of DM-RS APs associated with a PDSCH (Physical Downlink Shared Channel), and wherein the instructions, when executed, further cause the UE to decode the one or more DCI messages.

Example 25 comprises the subject matter of any variation of any of example(s) 23, wherein the QCL signaling comprises RRC (Radio Resource Control) signaling.

Example 26 comprises the subject matter of any variation of any of example(s) 23, wherein the QCL signaling comprises MAC (Media Access Control) signaling.

Example 27 comprises the subject matter of any variation of any of example(s) 23-26, wherein the QCL signaling indicates one or more reference signals that are QCL-ed with the first set of RS APs with respect to the one or more large-scale channel properties, wherein the QCL signaling indicates the one or more reference signals via one or more identifiers or indices associated with the one or more reference signals.

Example 28 is an apparatus configured to be employed within a User Equipment (UE), comprising: a memory; and one or more processors configured to: make a determination whether DM-RS (Demodulation Reference Signal) APs (Antenna Ports) are QCL-ed (Quasi Co-Located) with a set of beam training RS APs with respect to one or more large-scale channel properties, wherein the one or more large-scale channel properties comprise one or more spatial channel properties; and select, based on the determination, a set of beamforming weights for reception via the DM-RS APs.

Example 29 comprises the subject matter of any variation of any of example(s) 28, wherein the set of beam training RS APs comprises a set of CSI (Channel State Information) RS APs.

Example 30 comprises the subject matter of any variation of any of example(s) 28, wherein the set of beam training RS APs comprises a set of MRS (Mobility Reference Signal) APs.

Example 31 comprises the subject matter of any variation of any of example(s) 28-30, wherein the one or more processors are configured to make the determination that the DM-RS APs are non-QCL-ed with the set of beam training RS APs with respect to the one or more large-scale channel properties.

Example 32 comprises the subject matter of any variation of any of example(s) 31, wherein the one or more processors are further configured to select the set of beamforming weights for reception via the DM-RS APs to facilitate quasi-omni-directional reception via the DM-RS APs.

Example 33 is an apparatus configured to be employed within a User Equipment (UE), comprising: means for receiving QCL (Quasi Co-Location) signaling that indicates a QCL type between a first set of RS (Reference Signal) APs (Antenna Ports) and a distinct second set of RS APs; means for determining, based on the QCL type, whether the first set of RS APs are QCL-ed (Quasi Co-Located) with the second set of RS APs with respect to an average angle of arrival and an angle of arrival spread; means for employing a common set of beamforming weights for beamformed reception of a first set of signals associated with the first set of RS APs and for beamformed reception of a second set of signals associated with the second set of RS APs, in response to a determination that the first set of RS APs are QCL-ed with the second set of RS APs with respect to the average angle of arrival and the angle of arrival spread; and means for employing a quasi-omni-directional set of beamforming weights for quasi-omni-directional reception of the second set of signals associated with the second set of RS APs, in response to a determination that the first set of RS APs are non-QCL-ed with the second set of RS APs with respect to the average angle of arrival and the angle of arrival spread.

Example 34 comprises the subject matter of any variation of any of example(s) 33, wherein the QCL signaling comprises one or more DCI (Downlink Control Information) messages, wherein the second set of RS APs are a set of DM-RS APs associated with a PDSCH (Physical Downlink Shared Channel), and further comprising means for decoding the one or more DCI messages.

Example 35 comprises the subject matter of any variation of any of example(s) 33, wherein the QCL signaling comprises RRC (Radio Resource Control) signaling.

Example 36 comprises the subject matter of any variation of any of example(s) 33, wherein the QCL signaling comprises MAC (Media Access Control) signaling.

Example 37 comprises the subject matter of any variation of any of example(s) 33-36, wherein the QCL signaling indicates one or more reference signals that are QCL-ed with the first set of RS APs with respect to the one or more large-scale channel properties, wherein the QCL signaling indicates the one or more reference signals via one or more identifiers or indices associated with the one or more reference signals.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A baseband processor of a User Equipment (UE), comprising:
   one or more processors configured to:
     make a determination whether a first set of RS (Reference Signal) APs (Antenna Ports) are QCL-ed (Quasi Co-Located) with a second set of RS APs with respect to one or more large-scale channel properties, wherein the one or more large-scale channel properties comprise one or more spatial receiver parameters, and wherein the first set of RS APs are distinct from the second set of RS APs; and
     select a set of receiving parameters for the second set of RS APs based on the one or more spatial receiver parameters.

2. The baseband processor of claim 1, wherein the one or more spatial receiver parameters comprise an average angle-of-arrival and an angle of arrival spread.

3. The baseband processor of claim 1, wherein the one or more processors are configured to make the determination based on a predefined relationship between the first set of RS APs and the second set of RS APs.

4. The baseband processor of claim 1, wherein the one or more processors are further configured to:
   receive QCL signaling that indicates a type of QCL between the first set of RS APs and the second set of RS APs; and
   make the determination based on the indicated type of QCL.

5. The baseband processor of claim 4, wherein the QCL signaling comprises DCI (Downlink Control Information) messaging, wherein the second set of RS APs are a set of DM (Demodulation)-RS APs associated with a PDSCH (Physical Downlink Shared Channel), and wherein the one or more processors are further configured to decode the DCI messaging.

6. The baseband processor of claim 4, wherein the QCL signaling comprises one or more of RRC (Radio Resource Control) signaling or MAC (Media Access Control) signaling.

7. The baseband processor of claim 4, wherein the QCL signaling indicates one or more reference signals that are QCL-ed with the first set of RS APs with respect to the one or more large-scale channel properties, wherein the QCL signaling indicates the one or more reference signals via one or more identifiers or indices associated with the one or more reference signals.

8. The baseband processor of claim 1, wherein the one or more processors are configured to make the determination that the first set of RS APs are QCL-ed with the second set of RS APs with respect to the one or more large-scale channel properties, and wherein the one or more processors are configured to select, based on the determination, a first set of beamforming weights associated with the first set of RS APs as the set of receiving parameters for the second set of RS APs.

9. The baseband processor of claim 1, wherein the one or more processors are configured to make the determination that the first set of RS APs are non-QCL-ed with the second set of RS APs with respect to the one or more large-scale channel properties.

10. The baseband processor of claim 9, wherein the one or more processors are further configured to select the set of receiving parameters for the second set of RS APs to facilitate quasi-omni-directional reception for the second set of RS APs.

11. The baseband processor of claim 1, wherein the one or more large-scale channel properties comprise one or more of: an average delay, a delay spread, a Doppler shift, a Doppler spread, or an average gain.

12. The baseband processor of claim 1, wherein the first set of RS APs comprise a set of beam training RS APs, wherein the set of beam training RS APs comprises one or more of CSI (Channel State Information)-RS APs or MRS (Mobility RS) APs.

13. A baseband processor configured to be employed within a User Equipment (UE), comprising:
   one or more processors configured to:
     receive QCL (Quasi Co-Location) signaling that indicates a type of QCL between a first set of RS (Reference Signal) APs (Antenna Ports) and a second set of RS APs; and
     make a determination based on the indicated type of QCL that whether the first set of RS APs and the second set of RS APs are QCL-ed (Quasi Co-Located) with respect to one or more large-scale channel properties, wherein the one or more large-scale channel properties comprise one or more spatial receiver parameters; and
     select a set of receiving parameters for the second set of RS APs based on the type of QCL.

14. The baseband processor of claim 13, wherein the first set of RS APs or the second set of RS APs comprises DM-RS (Demodulation Reference Signal) APs (Antenna Ports) or CSI (Channel State Information) RS APs.

15. The baseband processor of claim 13,
   wherein the one or more processors are configured to make the determination that the first set of RS APs and the second set of RS APs are QCL-ed; and wherein the one or more processors are configured to select, based on the determination, a first set of beamforming weights associated with the first set of RS APs as the set of receiving parameters for the second set of RS APs.

16. The baseband processor of claim 13,
wherein the one or more processors are configured to make the determination that the first set of RS APs and the second set of RS APs are non-QCL-ed; and
wherein the one or more processors are further configured to select the set of receiving parameters for the second set of RS APs to facilitate quasi-omni-directional reception for the second set of RS APs.

17. A baseband processor configured to be employed within a base station, comprising:
one or more processors configured to:
generate QCL (Quasi Co-Location) signaling, wherein the QCL signaling indicates whether a first set of RS (Reference Signal) APs (Antenna Ports) associated with a User Equipment (UE) and a distinct second set of RS APs associated with the UE are QCL-ed (Quasi Co-Located) with respect to one or more large-scale channel properties, wherein the one or more large-scale channel properties comprise one or more spatial receiver parameters; and
transmit the QCL signaling to the UE.

18. The baseband processor of claim 17, wherein the QCL signaling indicates one or more identifiers or indices, wherein the one or more identifiers or indices are associated with one or more reference signals.

19. The baseband processor of claim 17, wherein the QCL signaling comprises one or more DCI (Downlink Control Information) messages, wherein the second set of RS APs comprise a set of DM-RS APs associated with a PDSCH (Physical Downlink Shared Channel), and wherein the one or more processors are further configured to encode the one or more DCI messages.

20. The baseband processor of claim 17, wherein the QCL signaling comprises RRC (Radio Resource Control) signaling.

* * * * *